United States Patent
Núñez León De Santos et al.

(10) Patent No.: US 6,205,170 B1
(45) Date of Patent: Mar. 20, 2001

(54) TRANSMISSION/RECEPTION UNIT WITH BIDIRECTIONAL EQUALIZATION

(75) Inventors: Gregorio Núñez León De Santos, Toledo; José Manuel Paez Borrallo, Madrid; Javier Casajús Quirós, Madrid; Rafael Burriel Lluna, Madrid; Alfonso Fernández Durań, Madrid, all of (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/037,753

(22) Filed: Mar. 10, 1998

(30) Foreign Application Priority Data

Mar. 11, 1997 (ES) .................................... 9700530

(51) Int. Cl.$^7$ ...................................... H04B 1/38
(52) U.S. Cl. .................... 375/219; 375/232; 375/284; 375/285; 375/346
(58) Field of Search .................... 375/222, 296, 375/232, 267, 284, 285, 313, 346; 455/63

(56) References Cited

U.S. PATENT DOCUMENTS

| | | | |
|---|---|---|---|
| 4,995,057 | * 2/1991 | Chung | 375/13 |
| 5,574,990 | * 11/1996 | Flanagan | 455/155 |
| 5,732,333 | * 3/1998 | Cox et al. | 455/126 |
| 5,748,678 | * 5/1998 | Valentine et al. | 375/297 |
| 5,778,029 | * 7/1998 | Kaufmann | 375/296 |
| 5,987,069 | * 11/1999 | Furukawa et al. | 375/285 |

FOREIGN PATENT DOCUMENTS

| | | |
|---|---|---|
| 0 202 596 A2 | 11/1986 | (EP) . |
| 0 405 743 A2 | 1/1991 | (EP) . |
| 0 655 849 A1 | 5/1995 | (EP) . |
| 07058679 | 3/1995 | (JP) . |

* cited by examiner

Primary Examiner—Stephen Chin
Assistant Examiner—Dac V. Ha
(74) Attorney, Agent, or Firm—Sughrue, Mion, Zinn, Macpeak & Seas, PLLC

(57) ABSTRACT

The present invention refers to a transmission/reception unit that exchanges data with a remote unit by means of a channel using distributed modulation/demodulation treatment means. The transmission/reception unit includes equalization means (23) to equalize a first signal received from said remote unit and predistortion means to predistort a second signal transmitted to said remote unit. According to the invention, the unit is characterized in that the modulation/demodulation treatment means operate in a non-linear way and the unit includes means (230) to store information that is representative of a non-linear distortion of said modulation/demodulation treatment means and which defines a non-linear reference, and means (233) to adjust coefficients (CO) in the equalization means (23) according to the signal received from the remote unit and said representative information, the mentioned adjusted coefficients being transmitted to said predistortion means.

2 Claims, 3 Drawing Sheets

TRANSMISSION/RECEPTION UNIT WITH BIDIRECTIONAL EQUALIZATION

OBJECT OF THE INVENTION

The present invention refers to a data transmission reception unit to exchange data with a remote unit by means of a channel using non-linear modulation/demodulation treatment means, for example frequency modulation/demodulation.

STATE OF THE ART

The use of frequency modulation methods, like that used in the European standard for wireless communication DECT, of the GFSK type, makes the use of frequency demodulators, for example by means of discriminators, recommendable; in this way, the recovery of data is possible by means of a simple threshold detector to decide between the two logic values "1" or "0".

In some fields of application of these methods, this type of receiver is sufficient due to the fact that the maximum temporary dispersion of the signal in the receiver is rather less than a symbol and, hence, the interference between symbols due to the radio channel is hardly detectable.

However, in other applications where radio coverage is greater and induces multiple trajectories of the waves, the effects of attenuation and reflection in the propagation thereof have to be taken into account. Therefore, the use of equalizers is recommendable, which rectify this effect that degrades the signal quality, considerably enhancing the probability of error of the recovered symbols. For this reason, some kind of equalizer is used, as shown in the article "Adaptive equalization for DECT systems operating in low time-dispersive channels" by J. Fuhl and G. Schultes, published in the magazine "Electronics Letters", Nov. 25, 1993, vol. 29, N 24, pages 2076–2077. In this article, an adaptive equalizer of the well-known DFE (decision feedback equalizer) type is used and where 16 bits of burst synchronization defined in the DECT are used as a training sequence. The training sequence is stored in a ROM memory and is applied to the equalizer when the signal corresponding to the training sequence received appears in the input thereof. This avoids that the possible errors that are produced in the detector when the coefficients of the filters are still unsuitable are fed back to the equalizer and permits that the convergence is produced faster.

When the type of modulation/demodulation is non-linear, even under ideal propagation conditions the demodulated signal may be considerably distorted due to the mentioned non-linear effect. Under these conditions, the convergence of the equalizer may be inadequately produced, since the non-linear process to which the received signal is submitted is not being duly taken into account. For example, the frequency modulator and the frequency discriminator introduce non-linear distortions given that the voltage-frequency conversion characteristic on the one hand, and the frequency-voltage on the other, are not a constant as in the ideal case.

More specifically, the invention refers to a transmission/reception unit, including a bidirectional correction device for the inter-symbolic interference acting through both directions of the radio channel. The device permits the correction of interferences in both directions of the data route, including an equalizer in the reception chain and a predistorter in the transmission chain. The objective of incorporating the bidirectional correction function of the inter-symbolic interference in the same transmission/reception unit is to reduce the cost of the other unit(s) that exchange data with said unit.

A device of this type, including an equalizer and a predistorter, is known from the document "Adaptive channel preceding for personal communications" by W. ZHUANG et al., published in the magazine "Electronics Letters", Sep. 15, 1994, vol. 30, N 19, pages 1570–1571. In this document, a solution to the problem of linear modulation/demodulation is proposed, this being phase modulation.

This limitation is the result of the superposition of the non-linear effects and the inter-symbolic interference effects due to the multiple trajectories of the waves, which hinders a "bidirectional equalization" in only one transmission/reception unit. If the non-linear effects do not permit the effective correction of the inter-symbolic interference in the received signal, an imperfect predistortion results, which may be worse than not using this predistortion. Furthermore, the requirements for updating the equalizer coefficients and the predistorter coefficients for each transmission/reception period using a short signal sequence to assess the channel status have to be taken into account.

CHARACTERIZATION OF THE INVENTION

One objective of the present invention is to propose a transmission/reception unit for a communications system operating in a non-linear mode, that includes a bidirectional correction device for the inter-symbolic interference. The invention is applied to the DECT system, but not exclusively.

As a result, a data transmission/reception unit that exchanges data with a remote unit by means of a channel using distributed modulation/demodulation treatment means distributed between said data transmission/reception unit and said remote unit, said transmission/reception unit including equalization means to equalize a first signal received from said remote unit and predistortion means to predistort a second signal transmitted to said remote unit, is characterized according to the invention in that (a)—the modulation/demodulation treatment means work according to a non-linear mode and (b)—the unit includes (b1) means to store information which is representative of a non-linear distortion of said modulation/demodulation treatment means and which defines a non-linear reference and (b2) means to adjust equalization means coefficients according to the signal received from the remote unit and said representative information, the mentioned adjusted coefficients being transmitted to said predistortion means.

Therefore, both in the equalizer and in the predistorter, the correction of the inter-symbolic interference is carried out independently from the non-linear distortion resulting from modulation/demodulation.

According to a first embodiment, the transmission/reception unit is characterized in that the adjustment means are calculation means minimizing an error signal in the equalization means, on the one hand according to said signal received from the remote unit and, on the other, to the mentioned representative information.

According to a second embodiment, the adjustment means include:

means to sample said first signal received from the remote unit to a frequency which is higher than a frequency of logic symbols associated to the received signals and to define sets of samples, each one defined by a sample phase, means to correlate said representative information with each one of the sample sets of the signal received from the remote unit, in order to determine an a priori optimum sample set, means to select a sample set between said a priori optimum sample set and some of said sample sets defined by respective sample phases near to the sample phase of said a priori optimum sample set, the selected set being the one that produces the smallest equalization error signal with respect to a sequence of logic symbols, and calculation means to minimize an error signal in the equalization means according, on the one hand, to said signal received from the remote unit when it is sampled with the sample phase of the selected sample set, and on the other hand, to said logic symbol sequence.

BRIEF DESCRIPTION OF THE FIGURES

A more detailed explanation of this invention is given in the following description based on the attached figures, in which.

DESCRIPTION OF THE INVENTION

The present invention, in a preferred embodiment, is applied in a base station for a digital communications system with GFSK modulation used in the European digital system of wireless telecommunications (DECT). This base station exchanges data with a remote unit, for example a terminal, using a duplex mode by division in time.

Figure 1:
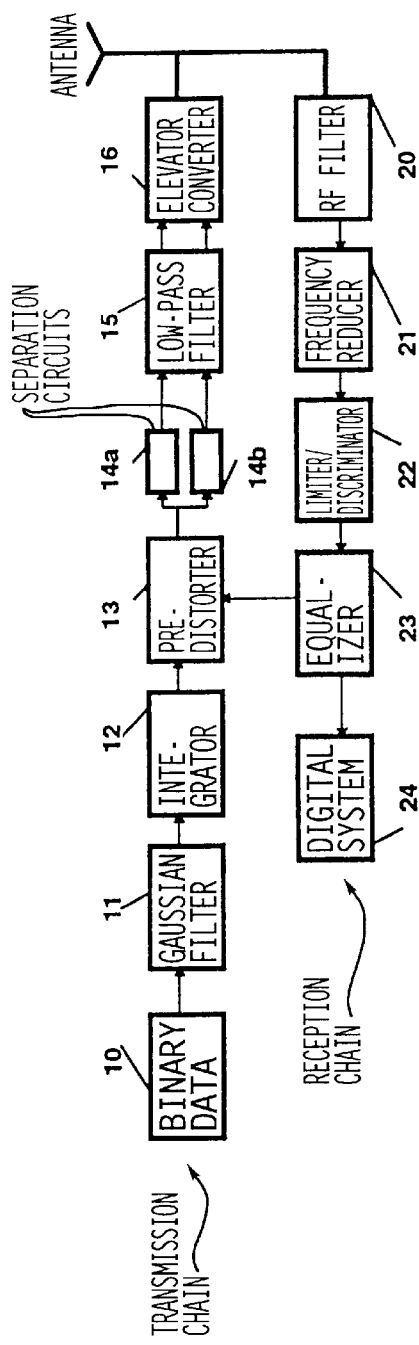
FIG. 1 shows a block diagram of a transmission/reception unit operating according to a phase predistortion mode.

In FIG. 1, the base station includes a transmission chain and a reception chain. The transmission chain includes, connected in cascade, a source of binary data 10, a Gauss filter 11, an integrator 12, a predistorter 13, two circuits 14a and 14b for separation of the components in quadrature, a low pass filter 15 and an elevator converter 16, the output of which is connected to an antenna. The reception chain includes, connected in cascade, an RF filter 20, a frequency reducer 21, a limiter/discriminator 22, an equalizer 23 and a digital system 24. The Gauss filter 11 and the integrator 12 are used to modulate the binary data to be sent in frequency and the limiter/discriminator 22 is used to demodulate the signal received in frequency.

Figure 2:
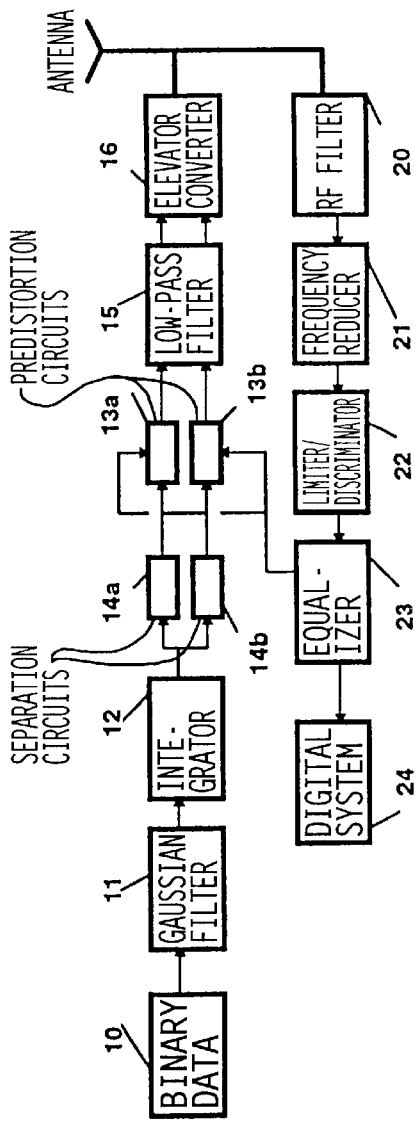
FIG. 2 shows a block diagram of a transmission/reception unit operating according to a predistortion mode for components in quadrature.

FIG. 2 shows the predistorter including two predistortion circuits 13a and 13b. Each one predistorts a signal corresponding to a component in phase and in quadrature. In this embodiment, the integrator 12 output is applied to the two circuits 14a and 14b for separation of the components in phase and in quadrature. The outputs of these two circuits 14a and 14b are respectively applied to the two predistortion circuits 13a and 13b. In FIG. 1, a coefficient transfer output of the equalizer 23 is applied to a coefficient updating input of the predistorter 13. In FIG. 2, a coefficient transfer output of the equalizer 23 is applied to a coefficient update input of each one of the two predistortion circuits 13a and 13b.

In a third embodiment (not shown), the reception chain includes, connected in cascade, the digital data source, a predistorter, a Gauss filter, a VCO and an elevator converter.

The predistorter 13 (FIG. 1) or the predistortion circuits 13a and 13b (FIG. 2) modify the signal received in their inputs with a transfer function compensating the inter-symbolic interference due to the radio channel.

Figure 3:
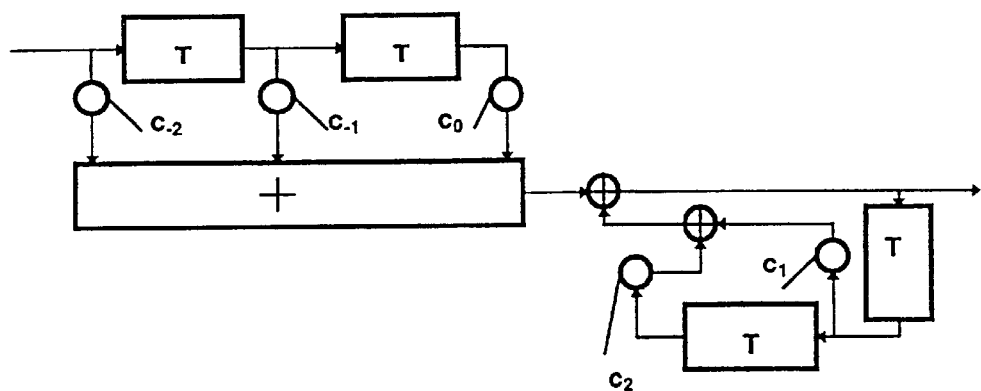
FIG. 3 shows a block diagram of an equalizer according to the state of the art.
Figure 4:
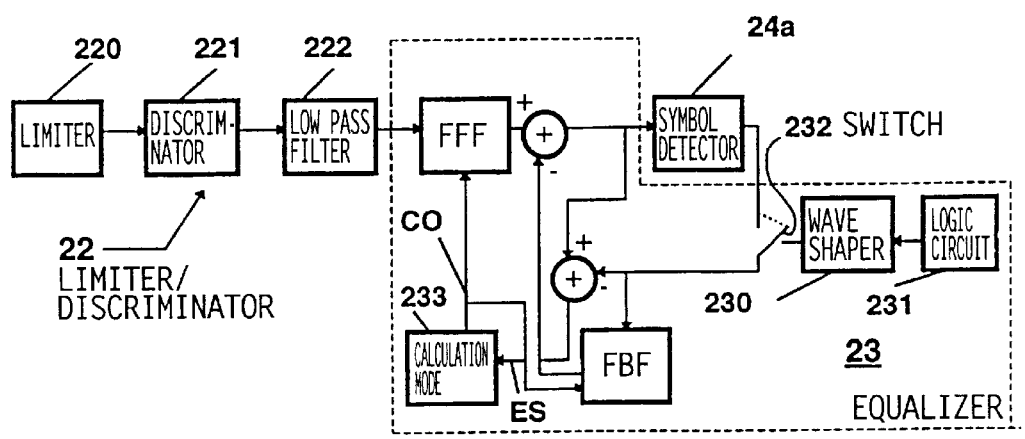
FIG. 4 shows a block diagram of one part of the reception chain of the transmission/reception unit according to the preferred embodiment in accordance with the invention.

FIGS. 3 and 4 show a first preferred embodiment of the invention. FIG. 4 shows the limiter/discriminator 22 of the reception chain of the base station including an amplitude limiter 220, a discriminator 221 and a low pass filter 222.

The function of the limiter 220 is to trim the signal, so that at its output the amplitude of the signal is always constant. This allows its demodulation to be performed without having to resort to automatic gain control methods. On being a system with frequency modulation and constant envelope, when filtering the trimmed signal again with an intermediate frequency filter, we obtain a signal with the same information as that received but this time with an always constant amplitude.

The frequency discriminator 221 is normally a multiplier which is a non-linear component, multiplying the signal to be demodulated by another which is that derived from the former and besides dephased 90°. The output signal of the discriminator 221 is sent to the low pass filter 222 which eliminates noise, especially that of higher frequencies whose effect is more damaging, since as we know, the spectral noise density at the output of a frequency demodulator is of the parabolic type.

Finally, the output signal of the aforementioned low pass filter 222 is sent, by means of the equalizer 23, to a symbol detector 24a that belongs to the digital system 24. This detector 24a is, in the simplest case, a comparator with a reference level corresponding to that provided by the demodulator in absence of a modulated signal; that is, when only the carrier is received. In this circumstance, the values above the reference level are equivalent to a logic value and the values below are equivalent to another logic value. Obviously, much more complex detectors can be used which obtain a lower probability of error for the same noise conditions, but this does not affect the object of the invention.

Through the remote terminal transmission chain up to the input to the symbol detector 24a of the base station, the signal passes through different components distorting the signal non-linearly, which are not in principle taken into account when equalizing and predistorting according to the state of the art described in the document "Adaptive channel precoding for personal communications" by W. ZHUANG et al., published in the magazine "Electronics Letters", Sep. 15, 1994, vol 30, N 19, pages 1570–1571.

For this reason, according to the invention, the equalizer 23 includes a wave shaper 230 which receives symbols of a training sequence TS formed of bits with logic states "1" and "0". This sequence is locally stored in the base station and is identical to a sequence sent by the remote terminal. The wave shaper 230 stores information which is representative of a non-linear distortion of the non-linear modulation/demodulation means which are distributed between the base station and the remote terminal or unit. This information defines a non-linear reference. The components taken into account in the transfer function of the wave shaper 230 are, for example, in the remote terminal transmission part, the premodulation Gauss filter and the frequency modulator and in the reception part of the base station, the amplitude limiter 220, the frequency discriminator 221 and the low pass filter 222. The specialist can limit the transfer function of the wave shaper 230 to some of these chain components of the terminal transmission chain and the reception chain of the base station which induce non-linear effects. The training sequence TS, which in this case for DECT is the burst training sequence, is stored in a logic circuit 231. For each DECT burst, an equalizer training phase is produced. This training phase is produced when the training sequence transmitted by the remote terminal is received in an input of a first FFF filter of the equalizer 23 of the base station. In this moment, the stored TS sequence is applied to an input of a second FBF filter by means of the wave shaper 230 by a switch 232.

As shown in FIGS. 3 and 4, the equalizer 23 includes, according to a known embodiment, the linear filter with feed FFF (Feed Forward Filter) and the linear filter with feedback FBF (FeedBack Filter), both defined by a delay "T" and coefficients CO which are $c_{-2}$, $c_{-1}$, $c_0$, $c_1$ and $c_2$ and also a calculation module 233. According to the invention, the equalizer 23 also includes the logic circuit 231 which stores the burst synchronism sequence TS and the wave shaper 230 whose input is connected to an output of the logic circuit 231. An FFF filter output is connected to an input of the symbol detector 24a, through an adder whose second input is connected to an FBF filter output. During the training phase, the output of the wave shaper 230 is applied to an FBF filter input. Except during this phase, the output of the symbol detector 24a is applied to an FBF filter input.

During the equalizer training phase, an algorithm stored in the calculation module 233 changes the CO coefficients= ($c_{-2}$, $c_{-1}$, $c_0$, $c_1$ and $c_2$) of the FFF and FBF filters, so that the signal produced by the wave shaper 230, when it receives the training sequence TS stored in a logic circuit, is as similar as possible to the signal produced at the symbol detector input, so that an error signal ES is obtained between these two signals whose mean square value asymptotically tends to zero.

At the end of the equalizer 23 training phase, the adaptation algorithm developed in the calculation module 233 is frozen so that the coefficients $c_{-2}$, $c_{-1}$, $c_0$, $c_1$ and $c_2$ calculated in both FFF and FBF filters of the equalizer 23 are maintained constant until the end of the burst or raster. According to the invention, the coefficients obtained at the end of the training phase are transmitted to the predistorter 13 (FIG. 1) or 13a and 13b (FIG. 2). The same coefficients are used to equalize the data received during a reception time interval which temporarily follows the sequence TS time interval, includes data and predistorts the signal transmitted through the transmission chain of the base station. The predistorter includes the same FFF and FBF filters (FIG. 3) as those of the equalizer EQU. This results in the predistorter operating with the same coefficients as those of the equalizer EQU during a transmission time interval defined with respect to the reception time interval with a delay equal to that defined in the Time Duplex mode of the DECT.

Figure 5:
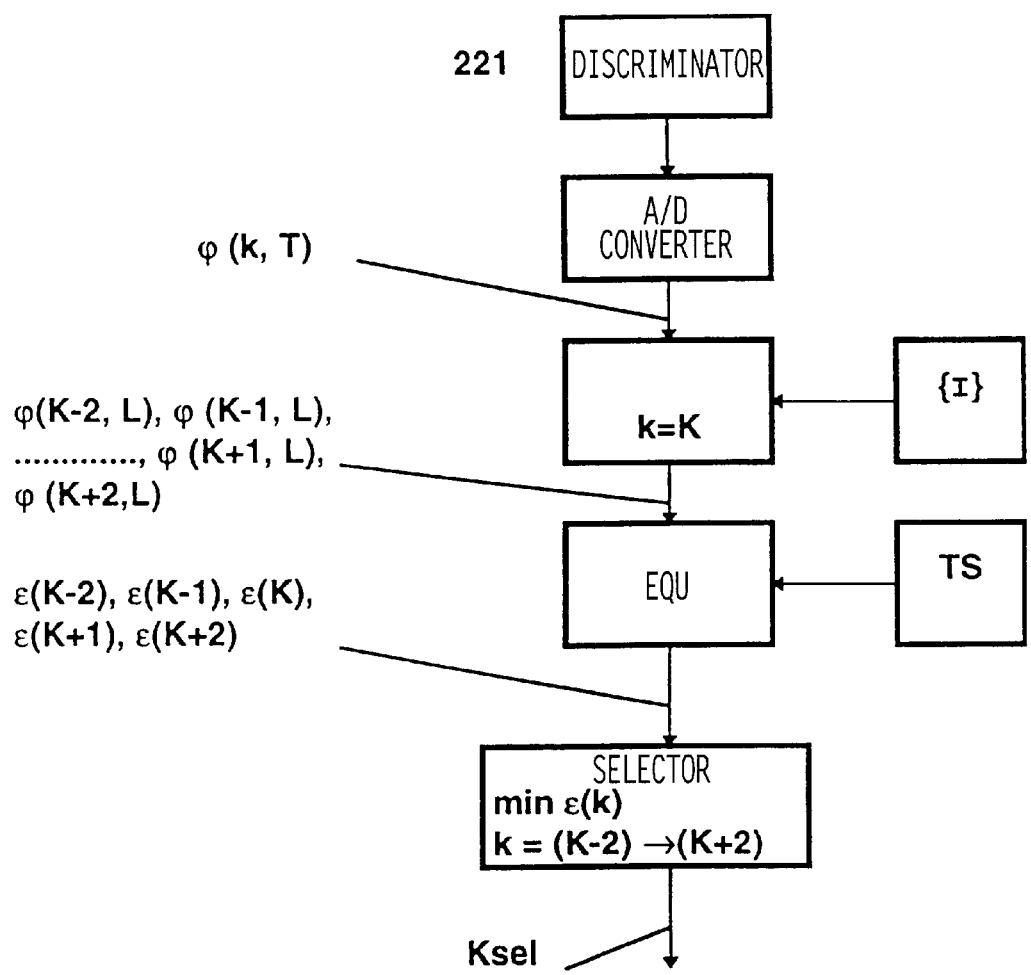
FIG. 5 shows an algorithm of a second embodiment according to the invention.

FIG. 5 shows a second embodiment of the invention. In this embodiment, the output of the discriminator 221 is applied to an analogic/digital converter A/D input. This converter samples the signal received from the remote unit with a higher sample frequency than the frequency of the logic symbols associated to the received signal. These logic symbols are the bits to which the modulation/demodulation is applied. Hence, sets of N samples are defined $\{\phi(k, T)\}$, where N is an integer, delimited by respective windows offset by a pitch of M samples, where M for example is equal to 1. A set of samples is defined by a same sample phase (between 0 and $2\pi$) of the received signal. In the notation $\{(\phi(k, T)\}$, k indicates the range of the first sample of the set and T indicates the bit period separating two consecutive samples of this set A correlator COR correlates a sequence {I} with each one of the obtained sample sets, to define an a priori optimum set of samples $\{\phi(k=K, T)\}$, defining a maximum correlation value. The sequence {I}, stored for example in a ROM memory, includes samples at bit frequency of a predefined sequence received through the transmission chain of the remote unit and the reception chain of the base station. Hence, the sequence {I} is representative of the non-linear distortion of the modulation/demodulation means distributed between the base station and the remote terminal. The predefined sequence is typically a synchronization sequence transmitted in each DECT raster.

To an input of the equalizer EQU, the a priori optimum sample set $\{\phi(k, T)\}$ is applied and also some $\{\phi(K-2, T)\}$, $\{\phi(K-1, T)\}$, $\{\phi(k, T)\}$, $\{\phi(K+1, T)\}$ and $\{\phi(K+2, T)\}$ of the other sample sets which are defined by respective sample phases near to the sample phase of the a priori optimum sample set. The equalizer EQU receives, on the one hand, a logic symbol sequence TS stored in a ROM memory and which corresponds in the DECT to the training sequence and, on the other hand, the sample sets $\{\phi(K-2, T)\}$, $\{\phi(K-1, T)\}$, $\{\phi(k, T)\}$, $\{\phi(K+1, T)\}$ and $\{\phi(K+2, T)\}$.

The equalizer EQU produces an error signal $\epsilon(K-2)$, $\epsilon(K-1)$, $\epsilon(K)$, $\epsilon(K+1)$ and $\epsilon(K+2)$ for each one of the sample sets $\{\phi(k-2, T)\}$, $\{\phi(K-1, T)\}$, $\{\phi(k, T)\}$, $\{\phi(K+1, T)\}$ and $\{\phi(K+2, T)\}$. A selector chooses the sample phase for which the equalization error signal $\epsilon(K-2)$, $\epsilon(K-1)$, $\epsilon(K)$, $\epsilon(K+1)$ and $\epsilon(K+2)$ is smallest. Hence, an optimum phase Ksel for the sample of the signal received is obtained.

After this synchronisation arrangement phase, a calculation module in the equalizer EQU defines the equalizer coefficients minimizing the error signal according to, on the one hand, said signal received from the remote unit when sampled with the sample phase of the selected sample set and, on the other, a training sequence TS.

These coefficients are transmitted to the predistorter to predistort the signal to be transmitted.

In another possible alternative to this second embodiment, an interpolation algorithm to define the sample sets ($\{\phi(K-2, T)\}$, $\{\phi(K-1, T)\}$, $\{\phi(K+1, T)\}$ and $\{\phi(K+2, T)\}$) which are defined by respective sample phases near to the sample phase of the a priori optimum sample set can be used. This solution permits the reduction of the sample frequency of the A/D converter.

In the DECT system, for the embodiments described above, the coefficients used in the equalization means to equalize the signal during a reception time interval are transmitted to the predistorter to predistort the signal during the following transmission time interval. In DECT, the ascending raster successively includes a synchronization sequence, a training sequence and the transmission and reception channels in temporary duplex mode.

In order to improve the quality of the predistorted signal, a spectral control can be applied to the predistorted signal. This spectral control may be in the form of an automatic gain control, which is applied to the predistorted signal imposing upon it a constant envelope.

Another way to improve the quality of the predistorted signal consists of studying the convenience of predistorting or not. The predistorter is activated when the non-linearity degree of the received signal is less than a reference level. On the other hand, the predistorter is not activated when the non-linearity degree of the signal received is greater than this reference level.

What is claimed is:

1. Data transmission/reception unit operable to exchange data with a remote unit through a channel using means for modulation/demodulation treatment distributed between said data transmission/reception unit and said remote unit, said transmission/reception unit including equalization means to equalize a first signal received from said remote unit and predistortion means to predistort a second signal transmitted to said remote unit, characterized in that (a)—the means for modulation/demodulation treatment operate according to a non-linear mode, and (b)—the unit includes (b1)—means to store information which is representative of a non-linear distortion of said modulation/demodulation treatment means and which defines a non-linear reference, and (b2)—means to adjust coefficients in the equalization means according to the signal received from the remote unit and said representative information, said adjusted coefficients being transmitted to said predistortion means, wherein said means to adjust coefficients includes;

means to sample said first signal received from the remote unit to a higher frequency than a frequency of logic symbols associated with the signal received and to define sample sets, each one defined by a sample phase respectively, means to correlate said representative information to each one of the sample sets ($\{\phi(k, T)\}$) of the signal received from the remote unit, to define a priori optimum sample set, means to select a sample set between said a priori optimum sample set and some of said sample sets defined by sample phases near to the sample phase of said a priori optimum sample set, the selected set being the set producing the smallest equalization error signal with respect to a logic symbol sequence, and calculation means to minimize an error signal in the equalization means, according, on the one hand, to said signal received from the remote unit when it is sampled with the sample phase of the selected sample set and, on the other, to said logic symbol sequence.

2. Transmission/reception unit according to claim 1, characterized in that said unit is a base station of a radio communications system with the mobile phones according to the DECT standard.

* * * * *